(12) United States Patent
Thomassin et al.

(10) Patent No.: US 11,124,311 B2
(45) Date of Patent: Sep. 21, 2021

(54) ENGINE ASSEMBLY WITH A DEDICATED VOLTAGE BUS

(71) Applicant: PRATT & WHITNEY CANADA CORP., Longueuil (CA)

(72) Inventors: Jean Thomassin, Sainte-Julie (CA); Eric Taillon, St-Amable (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 272 days.

(21) Appl. No.: 15/983,528

(22) Filed: May 18, 2018

(65) Prior Publication Data

US 2018/0339786 A1 Nov. 29, 2018

Related U.S. Application Data

(60) Provisional application No. 62/509,921, filed on May 23, 2017.

(51) Int. Cl.
| | |
|---|---|
| *B64D 35/08* | (2006.01) |
| *F02N 11/04* | (2006.01) |
| *F02C 7/36* | (2006.01) |
| *F01D 13/00* | (2006.01) |
| *F01D 15/10* | (2006.01) |
| *F02C 7/275* | (2006.01) |
| *F02C 7/32* | (2006.01) |

(Continued)

(52) U.S. Cl.
CPC ........... *B64D 35/08* (2013.01); *F01D 13/003* (2013.01); *F01D 15/10* (2013.01); *F02C 7/275* (2013.01); *F02C 7/32* (2013.01); *F02C 7/36* (2013.01); *F02N 11/04* (2013.01); *H02J 1/00* (2013.01); *H02J 3/00* (2013.01); *B64C 25/405* (2013.01); *B64D 41/00* (2013.01); *B64D 2221/00* (2013.01); *F05D 2220/50* (2013.01); *F05D 2220/90* (2013.01)

(58) Field of Classification Search
CPC ....... B64D 35/08; F01D 13/003; F01D 15/10; F02C 7/275; F02C 7/32; F02C 7/36; F02N 11/04
USPC ................................................... 244/53 A, 60
See application file for complete search history.

(56) References Cited

U.S. PATENT DOCUMENTS

| | | | |
|---|---|---|---|
| 6,717,282 B1 * | 4/2004 | Maxwell | ................. F02N 11/04 290/40 B |
| 8,201,523 B2 | 6/2012 | Cohen | |

(Continued)

FOREIGN PATENT DOCUMENTS

EP 3112271 1/2017

*Primary Examiner* — Brady W Frazier

(74) *Attorney, Agent, or Firm* — Norton Rose Fulbright Canada LLP

(57) ABSTRACT

There is provided an engine assembly for an aircraft, comprising a heat engine in driving engagement with an engine shaft having a first end coupled to a mechanical gearbox and a second end opposite the first end, an electric generator coupled to the second end to provide a generator output voltage, the electric generator separate from the mechanical gearbox, a power electronics module connected to the electric generator and configured to regulate the generator output voltage to provide a regulated output voltage that meets an electrical power demand of at least one aircraft accessory, and a voltage bus connected to the power electronics module and configured to supply the regulated output voltage to the at least one aircraft accessory.

14 Claims, 3 Drawing Sheets

(51) Int. Cl.
  *B64D 41/00*     (2006.01)
  *H02J 1/00*      (2006.01)
  *H02J 3/00*      (2006.01)
  *B64C 25/40*     (2006.01)

(56) References Cited

U.S. PATENT DOCUMENTS

| | | | |
|---|---|---|---|
| 8,757,542 B2* | 6/2014 | Hopdjanian | B60L 3/0046 |
| | | | 244/53 R |
| 9,002,552 B2 | 4/2015 | Timmons et al. | |
| 9,963,095 B2* | 5/2018 | Huang | F01D 15/10 |
| 2004/0090204 A1* | 5/2004 | McGinley | B60L 50/61 |
| | | | 318/767 |
| 2005/0001598 A1* | 1/2005 | Belokon | F02C 9/28 |
| | | | 323/234 |
| 2005/0056021 A1* | 3/2005 | Belokon | F02C 9/28 |
| | | | 60/772 |
| 2008/0238202 A1* | 10/2008 | Kern | H02P 9/302 |
| | | | 307/53 |
| 2010/0083669 A1* | 4/2010 | Foster | F01K 23/10 |
| | | | 60/802 |
| 2010/0264724 A1* | 10/2010 | Nelson | H02J 15/00 |
| | | | 307/9.1 |
| 2013/0062885 A1 | 3/2013 | Taneja | |
| 2013/0232941 A1 | 9/2013 | Huang | |
| 2014/0020381 A1* | 1/2014 | Bolduc | F01C 11/008 |
| | | | 60/605.1 |
| 2014/0084677 A1* | 3/2014 | Haillot | B60R 16/03 |
| | | | 307/9.1 |
| 2015/0013306 A1 | 1/2015 | Shelley | |
| 2016/0359324 A1 | 12/2016 | Knowles et al. | |
| 2017/0029131 A1* | 2/2017 | Steinwandel | B64C 39/024 |
| 2017/0129617 A1 | 5/2017 | Shah et al. | |
| 2017/0334422 A1 | 11/2017 | Namuduri et al. | |
| 2018/0162369 A1* | 6/2018 | Colavincenzo | B60K 6/485 |

* cited by examiner

ENGINE ASSEMBLY WITH A DEDICATED VOLTAGE BUS

CROSS-REFERENCE TO RELATED APPLICATIONS

The present application claims priority under 35 U.S.C. 119(e) of Provisional Patent Application bearing Ser. No. 62/509,921 filed on May 23, 2017, the contents of which are hereby incorporated by reference.

TECHNICAL FIELD

The present disclosure relates generally to an engine assembly for use in an aircraft, and, more particularly, to an engine assembly comprising a dedicated voltage bus for driving aircraft accessories.

BACKGROUND OF THE ART

Electrical systems of aircrafts typically include an AC (alternating current) voltage bus and a DC (direct current) voltage bus. However, the output voltage level and/or frequency of these voltage buses are typically fixed by standards and/or conventions, which limits the type of accessories that may draw power from these buses.

In addition, accessories not suitable for drawing power from conventional AC and DC aircraft buses may require an AC or a DC mechanical driver connected to a mechanical accessory gearbox in order to provide the required output voltage. This may lead to additional heavy components in the aircraft and/or power inefficiencies.

As such, there is room for improvement.

SUMMARY

In one aspect, there is provided an engine assembly for an aircraft, comprising a heat engine in driving engagement with an engine shaft having a first end coupled to a mechanical gearbox and a second end opposite the first end, an electric generator coupled to the second end to provide a generator output voltage, the electric generator separate from the mechanical gearbox, a power electronics module connected to the electric generator and configured to regulate the generator output voltage to provide a regulated output voltage that meets an electrical power demand of at least one aircraft accessory, and a voltage bus connected to the power electronics module and configured to supply the regulated output voltage to the at least one aircraft accessory.

In another aspect, there is provided a method of providing electrical power to an aircraft, the method comprising rotating an engine shaft with at least one heat engine of an engine assembly, the engine shaft provided with a first end coupled to a mechanical gearbox and a second end opposite the first end, driving an electric generator with the engine shaft to provide a generator output voltage, the electric generator provided at the second end of the engine shaft, regulating the generator output voltage to provide a regulated output voltage that meets an electrical power demand of at least one aircraft accessory, and supplying the regulated output voltage to the at least one aircraft accessory through a voltage bus.

DESCRIPTION OF THE DRAWINGS

Reference is now made to the accompanying figures in which.

It will be noted that throughout the appended drawings, like features are identified by like reference numerals.

DETAILED DESCRIPTION

Figure 1:
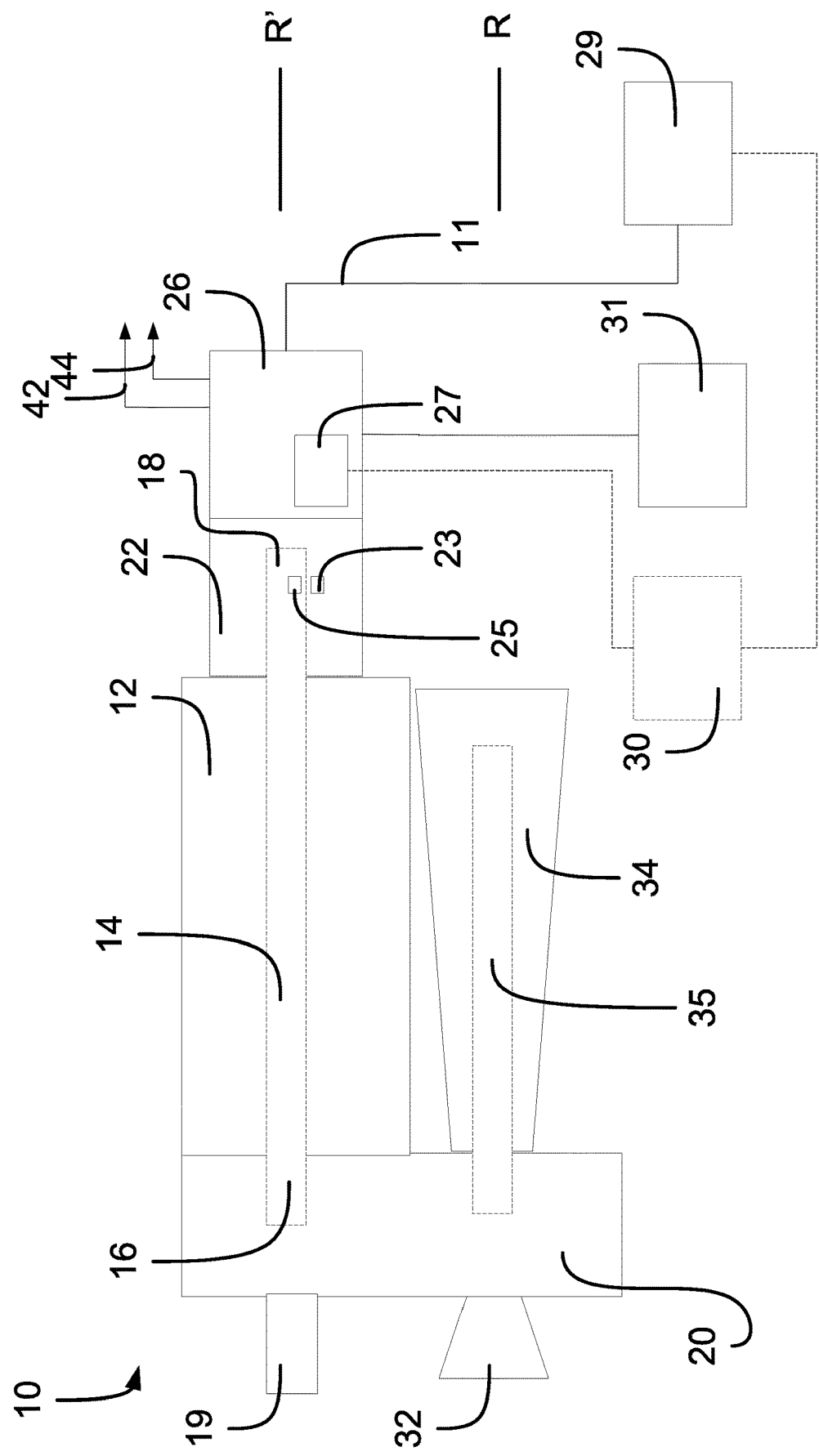
FIG. 1 is a schematic example of an engine assembly in accordance with an embodiment.

Referring to FIG. 1, an engine assembly 10 is generally shown. As should become more readily apparent throughout this document, the engine assembly 10 is configured such that it provides at least one dedicated voltage bus 11.

In accordance with an embodiment, the engine assembly 10 uses a compounding series configuration. This may allow for the electric power to come from one spool within a turbomachinery mechanically coupled to a final load or from split spools. In a particular embodiment, the engine assembly 10 is a compound cycle engine system or compound cycle engine such as described in Lents et al.'s U.S. Pat. No. 7,753,036 issued Jul. 13, 2010 or as described in Julien et al.'s U.S. Pat. No. 7,775,044 issued Aug. 17, 2010, or as described in Thomassin et al.'s U.S. patent publication No. 2015/0275749 published Oct. 1, 2015, or as described in Bolduc et al.'s U.S. patent publication No. 2015/0275756 published Oct. 1, 2015, the entire contents of all of which are incorporated by reference herein. The compound cycle engine system may be used as a prime mover engine, such as on an aircraft or other vehicle, or in any other suitable application.

The engine assembly 10 may also be known as a powerplant. In a specific example of implementation, the engine assembly 10 is an auxiliary power unit (APU), also known as a range extender. The engine assembly 10 may accommodate for a portion of mechanical, electrical, hydraulic and/or pneumatic power source.

In accordance with an embodiment, the engine assembly 10 comprises a heat engine 12 such as an internal combustion engine. In a particular embodiment, the heat engine 12 comprises one or more rotary engines, for example Wankel engines, or one or more reciprocating pistons. The heat engine 12 drives an engine shaft 14 having a first end 16 and a second end 18. The first end 16 is used for driving a rotatable load (not shown) via a mechanical output 19 of a mechanical gearbox 20. The mechanical gearbox 20 may comprise one or more gears and/or gear trains for providing speed and/or torque conversions from the first end 16 of the engine shaft 14 to the rotatable load via the mechanical output 19.

Figure 2:
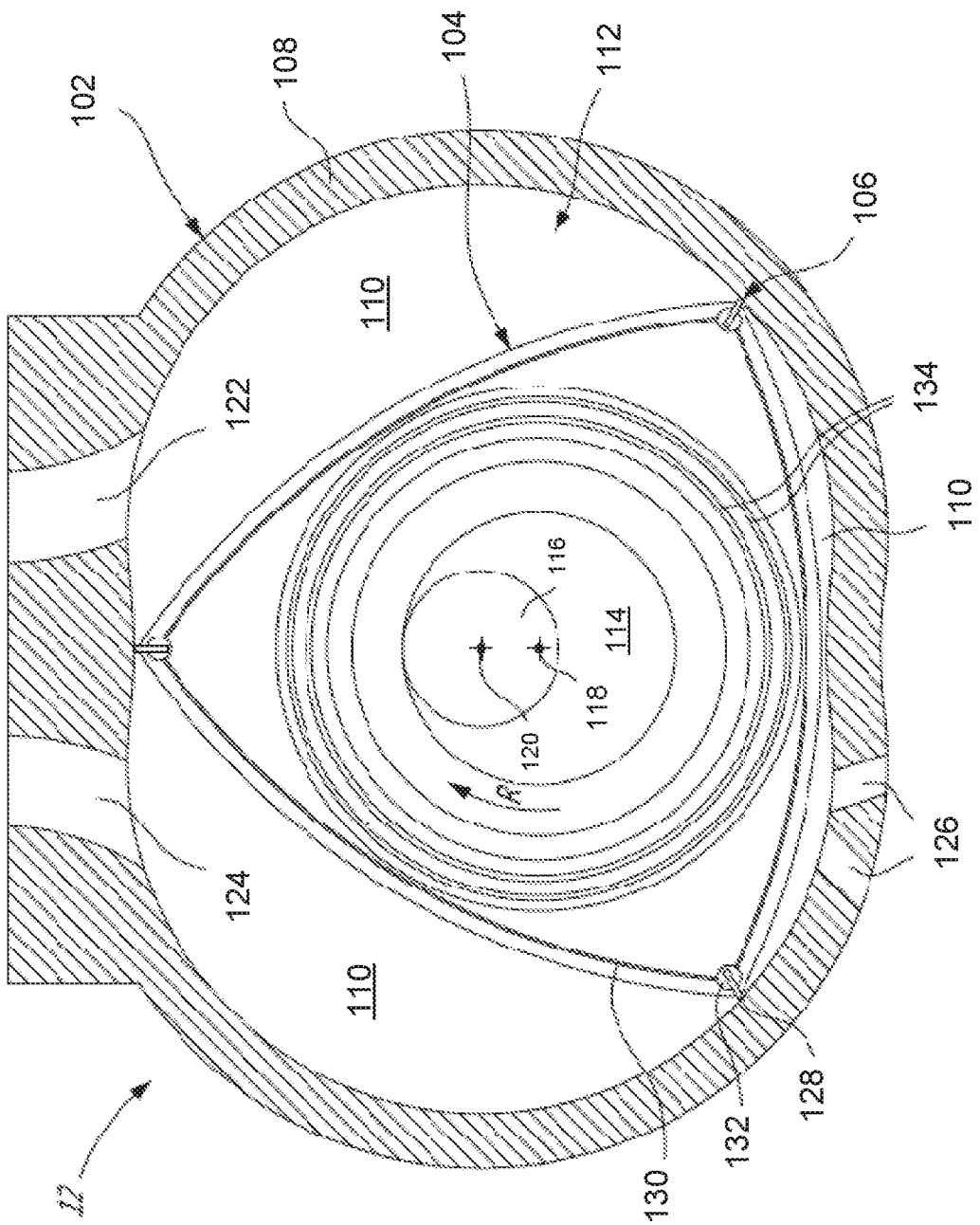
FIG. 2 is a schematic cross-sectional view of a rotary engine which may be used in the engine assembly of FIGS. 1.

Referring to FIG. 2, an example of a Wankel engine which may be used in the engine 12 is shown. It is understood that the configuration of the engine 12, e.g. placement of ports, number and placement of seals, etc., may vary from that of the embodiment shown. The engine 12 comprises a housing 102 defining a rotor cavity having a profile defining two lobes, which is preferably an epitrochoid. A rotor 104 is received within the rotor cavity. The rotor 104 defines three circumferentially-spaced apex portions 106, and a generally triangular profile with outwardly arched sides. The apex portions 106 are in sealing engagement with the inner surface of a peripheral wall 108 of the housing 102 to form and separate three working chambers 110 of variable volume between the rotor 104 and the housing 102. The peripheral wall 108 extends between two axially spaced apart end walls 112 to enclose the rotor cavity.

The rotor 104 is engaged to an eccentric portion 114 of an output shaft 116 to perform orbital revolutions within the rotor cavity. The output shaft 116 performs three rotations for each orbital revolution of the rotor 104. The geometrical axis 118 of the rotor 104 is offset from and parallel to the axis 120 of the housing 102. During each orbital revolution, each chamber 110 varies in volume and moves around the rotor cavity to undergo the four phases of intake, compression, expansion and exhaust.

An intake port 122 is provided through the peripheral wall 108 for admitting compressed air into one of the working chambers 110. An exhaust port 124 is also provided through the peripheral wall 108 for discharge of the exhaust gases from the working chambers 110. Passages 126 for a spark plug, glow plug or other ignition mechanism, as well as for one or more fuel injectors of a fuel injection system (not shown) are also provided through the peripheral wall 108. Alternately, the intake port 122, the exhaust port 124 and/or the passages 126 may be provided through the end or side wall 112 of the housing. A subchamber (not shown) may be provided in communication with the chambers 110, for pilot or pre injection of fuel for combustion.

For efficient operation, the working chambers 110 are sealed by spring-loaded peripheral or apex seals 128 extending from the rotor 104 to engage the inner surface of the peripheral wall 108, and spring-loaded face or gas seals 130 and end or corner seals 132 extending from the rotor 104 to engage the inner surface of the end walls 112. The rotor 104 also includes at least one spring-loaded oil seal ring 134 biased against the inner surface of the end wall 112 around the bearing for the rotor 104 on the shaft eccentric portion 114.

The fuel injector(s) of the engine 12, which in a particular embodiment are common rail fuel injectors, communicate with a source of heavy fuel (e.g. diesel, kerosene (jet fuel), equivalent biofuel), and deliver the heavy fuel into the engine 12 such that the combustion chamber is stratified with a rich fuel-air mixture near the ignition source and a leaner mixture elsewhere.

In accordance with an embodiment, the engine assembly 10 comprises an electric generator 22 for producing an electrical output. The electrical output may be referred to as a generator output voltage. In accordance with an embodiment, the generator output voltage is an AC (alternating current) voltage. The second end 18 of the engine shaft 14 is used for driving the generator 22 when the heat engine 12 is in operation such that the electrical output can be produced. The generator 22 is separate from the gearbox 20, which may eliminate the need for a DC (direct current) generator and/or an AC alternator, which may conventionally be found in the mechanical gearbox 20 for providing AC and DC buses in aircrafts.

In accordance with an embodiment, the engine assembly 10 comprises one or more high power density permanent magnets. For example, a high power density permanent magnet 25 may be directly integrated with the engine shaft 14 and a winding 23 may be directly integrated with the generator 22. As illustrated, the high power density permanent magnet 25 is directly attached to the engine shaft 14 proximate the second end 18 to provide a rotor, thereby electromagnetically coupling the generator 22 to the second end 18. The winding 23 may be directly attached to the generator 22 to provide a stator. In the embodiment illustrated, the high power density permanent magnet 25 is not integrated inside the engine but is cantilevered off of the engine shaft 14. In some embodiments, the permanent magnet 25 is directly attached to the engine shaft 14 and is supported by bearings that rotate the engine shaft 14. Other suitable configurations of the high power density permanent magnets may be possible. It should be appreciated that, by using high power density permanent magnet 25, the generator 22 used in practical implementation may be smaller than using an induction generator. Still, in other embodiments, the generator 22 is an induction generator.

In accordance with an embodiment, the generator 22 is a starter-generator, which may also be known as a motor-generator. That is, in some embodiments, the generator 22 is a starter for starting the heat engine 12 by driving the second end 18 of the engine shaft 14. In embodiments where the generator 22 is a starter-generator for starting the heat engine 12, this may eliminate the need for a separate starter which would conventionally be provided in the gearbox 20.

The combination of the heat engine 12 and the generator 22 may be referred to as a hybrid-electric drive. In accordance with an embodiment, the generator 22 can be used for example to drive rotors of a vertical lift vehicle. The heat engine 12 can be turned off, or can run on pilot injection only (e.g., five (5) times less fuel than idle mode) so that emergency power is readily available, during take-off and landing, while the generator 22 drives the rotors under battery power; the heat engine 12 may be turned on during flight to drive the electric generator and recharge a battery 31. Other modes of use are also possible.

In the embodiment shown, the engine assembly 10 comprises a compressor 32 for compressing the air before it is fed to the intake of the heat engine 12, and a turbine section 34 receiving the exhaust gases from the heat engine 12. It is understood that variations are possible, and that, for example, the compressor 32 and/or turbine section 34 may be omitted.

In the illustrated embodiment, the heat engine 12, the compressor 32, and the turbine section 34 are in driving engagement with the gearbox 20. The gearbox 20 may be configured to allow the turbine section 34 via the turbine shaft 35 to compound power with the engine shaft 14 and to allow the turbine section 34 and/or the heat engine 12 to drive the compressor 32.

In the illustrated embodiment, the compressor 32, the turbine section 34, and the gearbox 20 are serially disposed along a rotational axis R. A rotational axis R' of the heat engine 12 is radially offset from the rotational axis R of the compressor 32 and of the turbine section 34. In the illustrated embodiment, shafts 14, 35 are used to connect the compressor 32, the turbine section 34, and the heat engine 12 to the gearbox 20, respectively. Alternate configurations are possible, including, but not limited to, the compressor 32, turbine section 34, and heat engine 12 disposed coaxially, or the shafts 14, 35 extending at an angle (perpendicularly or otherwise) to each other. The compressor 32 may be located at any other suitable position. The compressor 32 may rotate at the same or different speed from the turbine shaft 35.

In accordance with an embodiment, the engine assembly 10 may comprise a thermal cooling system (not illustrated). The thermal cooling system may direct coolant to the heat engine 12 and/or the generator 22. In accordance with a specific and non-limiting example of implementation, a common thermal cooling system is used to cool the heat engine 12 and the generator 22.

In accordance with an embodiment, the engine assembly 10 may comprise an oil system (not illustrated). The oil system may direct lubricant to the heat engine 12 and/or the generator 22. In accordance with a specific and non-limiting example of implementation, a common oil system is used to lubricate the heat engine 12 and the generator 22.

In accordance with an embodiment, the engine assembly 10 comprises a power electronics module 26 connected to the electrical generator 22. The power electronics module 26 is configured for converting the electrical output of the generator 22 to produce a regulated output voltage. In accordance with an embodiment, the output voltage is a direct current (DC) voltage output having a given voltage level. In accordance with another embodiment, the output voltage is an alternating current (AC) voltage output having a given voltage level and a given frequency. The power electronics module 26 may comprise a controller 27 for adjusting the output voltage level and/or frequency of the output voltage produced by the generator 22. The power electronics module 26 may convert an AC electrical output of the generator 22 to a DC voltage output. The power electronics module 26 may convert an AC electrical output of the generator 22 to a different AC electrical output. The power electronics module 26 may be directly integrated with the generator 22. In other cases, the power electronics module 26 is external to the generator 22. The power electronics module 26 may comprise any suitable converter, regulator, transformer and/or any other suitable electronic circuitry.

The power electronics module 26 may be configured to provide a regulated output voltage that meets an electrical power demand of at least one accessory 29. For example, in the case where the regulated output voltage is a DC voltage, the power electronics module 26 may be configured to maintain the DC voltage at a substantially constant level in response to a changing power demand of the at least one aircraft accessory 29. That is, the power electronics module 26 may be configured to adjust the output current to keep the DC voltage level constant. By way of another example, in the case where the regulated output voltage is an AC voltage, the power electronics module 26 may be configured to maintain a frequency of the AC voltage substantially constant and/or a root mean square (RMS) level of the AC voltage substantially constant, in response to a changing power demand of the at least one aircraft accessory 29.

As illustrated, the dedicated voltage bus 11 is connected to the power electronics module 26. The dedicated voltage bus 11 is configured for supplying the regulated voltage output of the power electronics module 26 to the at least one accessory 29. In accordance with an embodiment, the dedicated voltage bus 11 is a DC voltage bus (not illustrated). In accordance with another embodiment, the dedicated voltage 11 bus is an AC voltage bus (not illustrated). Depending on the application, the dedicated voltage bus 11 may be a high voltage bus, a medium voltage bus, a low voltage bus and/or any other suitable voltage bus. The output voltage level and/or frequency of dedicated voltage bus 11 may be set by the power electronics module 26.

It should be appreciated that, by integrating the generator 22 with the heat engine 12 separate from the mechanical gearbox 20, the dedicated voltage bus 11 can be provided. It should further be appreciated that in practical implementations, the generator 22 would typically be designed such that the output power of the generator 22 would be able to meet the power demand of the accessories 29 connected to the dedicated voltage bus 11.

The dedicated voltage bus 11 can supply the output voltage at a level and/or frequency that is different from conventional voltage buses in aircrafts. For example, conventional AC voltage buses in aircrafts are typically 115 to 120V AC with a 400 Hz frequency. Conventional DC voltage buses in aircrafts are typically 28V DC or 14V DC. It should be appreciated that the conventional voltage level and/or frequency may not be suitable for certain accessories and/or may lead to energy inefficiencies. It should be appreciated that the dedicated voltage bus 11 is separate from the gearbox 20, which may eliminate the need for conventional AC and/or DC voltage buses off of the gearbox 20.

It should also be appreciated that providing the dedicated voltage bus 11 directly from the generator 22 may eliminate the need for AC and/or DC mechanical drivers connected to the mechanical gearbox 20.

It should further be appreciated that providing the dedicated voltage bus 11 directly from the generator 22 may alleviate the need for local inverters. For example, instead of an inverter being present in the mechanical gearbox 20 to convert the mechanical output of the heat engine 12 to an AC voltage signal, the dedicated voltage bus 11 is able to provide an AC voltage signal directly from the generator 22.

In accordance with an embodiment, an electronic engine control (EEC) 30 may communicate with the at least one accessory 29 to control the at least one accessory 29. For example, the EEC 30 may instruct the accessory 29 to turn on and/or to turn off. The EEC may instruct the accessory 29 to increase and/or decrease its power consumption and hence the amount of power it draws from the dedicated voltage bus 11. For instance, if the accessory 29 is a motor, the EEC 30 may control the speed of the motor. The EEC 30 may be connected to one or more sensors (not illustrated) and/or an aircraft command system (not illustrated). The EEC 30 may control the accessory 29 in response to readings from the sensors and/or instructions from the aircraft command system.

In accordance with an embodiment, the EEC 30 may communicate with the controller 27 to instruct the controller 27 to adjust the output voltage provided to the at least one accessory 29 via the voltage bus 11. The EEC 30 may direct the controller 27 to adjust the output voltage level and/or frequency in response to a request from the aircraft command system and/or in response to a reading of the sensor. Thus, the EEC 30 may select a specific output voltage level and/or frequency and instruct the controller 27 to adjust power electronics module 26 accordingly to provide the specific output voltage level and/or frequency.

In some embodiments, rather than the EEC 30 instructing the controller 27 to adjust the output voltage and/or frequency provided to the at least one accessory 29 via the voltage bus 11, the EEC 30 directly instructs the at least one accessory 29 to adjust its voltage and/or frequency. The EEC 30 may direct the at least one accessory 29 to adjust the output voltage level and/or frequency in response to a request from the aircraft command system and/or in response to a reading of the sensor. Thus, the EEC 30 may select a specific output voltage level and/or frequency and instruct the at least one accessory 29 to adjust power electronics module 26 accordingly to provide the specific output voltage level and/or frequency.

Depending on the mode of operation of the generator 22, the EEC 30 may instruct the generator 22 (via the controller 27) to adjust its output power and/or adjust its input power. Indeed, the generator 22 may be in either a starting mode or a generating mode. When in the starting mode, the generator 22 is used as a starter and when in the generating mode, the generator 22 is used as a generator.

It should be understood that the EEC 30 may be separate from or integrated with the controller 27, depending on the implementation.

The accessory 29 may be a motor, a linear actuator, a rotary actuator, an electric-mechanical machine, a hydraulic valve, a pneumatic value electrically connected, and/or any other suitable device. For example, the accessory 29 may be any suitable electrical, mechanical, pneumatic and/or hydraulic device.

In accordance with a specific and non-limiting example of implementation, the accessory 29 is an electric cooling fan. The power consumption of the electric cooling fan would typically depend on the rotational speed of the cooling fan. The EEC 30 may control the rotational speed of the electric cooling fan depending on cooling requirements. For example, the EEC 30 may receive a temperature signal from a temperature sensor (not illustrated), process the temperature signal, and instruct the electric cooling fan to operate accordingly.

In accordance with an embodiment, the cooling fan may have a controllable fan speed which depends of the voltage level supplied thereto. For example, an increase in the voltage level supplied to the cooling fan would result in the cooling fan rotating faster, while a decrease in the voltage level supplied to the fan would result in the cooling fan rotating slower. The power electronics module 26 may adjust the level of voltage supplied to the cooling fan via the voltage bus 11 such that fan speed can be adjusted depending on cooling requirements. For example, the EEC 30 may send one or more control signals to the controller 27 such that the power electronics module 26 controls the voltage level supplied to the cooling fan.

It should be appreciated that an electric cooling fan connected to the dedicated voltage bus 11, where the electric cooling fan is controllable depending on cooling requirements, would typically use less power than a conventional fan powered by mechanical power. Conventionally, a mechanical power output would typically be designed to operate the conventional fan at a worst case hot temperature condition. For example, if the conventional fan requires 40 kW of power to operate in worst case high temperature conditions, a mechanical driver connected to the mechanical gearbox 20 would conventionally be designed to consume 40 kW during aircraft operation regardless of the current temperature condition typically leading to energy inefficiencies.

In accordance with another specific and non-limiting example of implementation, the accessory 29 is an electric motor for driving a wheel for taxiing of the aircraft. The electric motor may have a controllable rotational speed for driving the wheel. For example, the aircraft command system may send signals to the EEC 30 which in turn controls the electric motor of the driving wheel.

It should be appreciated that the electric motor for taxiing may be a low weight motor that is typically lighter than a conventional motor used for taxiing in aircrafts. The dedicated voltage bus 11 may indeed provide a high voltage level, which may be higher than a voltage level of a conventional aircraft voltage bus, allowing for a lower weight motor to be used.

In accordance with another specific and non-limiting example of implementation, the accessory 29 is an actuator for controlling a guided vane of the aircraft.

The accessory 29 may be any suitable accessory that requires power in an aircraft and the example accessories described herein are for example purposes only. Other accessories may include accessories having voltage input level and/or frequency requirements different from the voltage output level and/or frequency of conventional voltage buses in aircrafts.

While only a single dedicated voltage bus 20 and a single accessory 29 are illustrated in FIG. 1, this is for illustration purposes only. Depending on the practical implementation, multiple dedicated voltage buses as in 11 may be provided for supplying power to multiple accessories. For example, if the aircraft includes a plurality of accessories as in 29, each of the accessories may have its own dedicated voltage bus from a plurality of dedicated voltage buses. In other cases, multiple accessories may share a single dedicated voltage bus. It should be appreciated that the voltage level and/or frequency of each bus in the plurality of voltage buses may vary from each other.

In accordance with an embodiment, the engine assembly 10 comprises one or more batteries 31. The batteries 31 may be used to supply power to the generator 22 such that the generator 22 is able to start the heat engine 12. The batteries 31 may be used to drive the accessory 29. The generator 22 may be used to charge the batteries 31. The batteries 31 may contribute to the mechanical load drive as required depending on the design choices in terms of electrical power proportion.

In accordance with an embodiment, an AC voltage bus 42 and a DC voltage bus 44 having an output voltage level and/or frequency corresponding to that of conventional aircraft voltage buses may also be provided by the power electronics module 26 to supply power to other accessories (not illustrated). While, the output voltage level and/or frequency of the AC voltage bus 42 and/or the DC voltage bus 44 may correspond to that of conventional aircraft voltage buses, the conventional aircraft voltage buses would have typically been provided off of the mechanical accessory gearbox 20.

In some embodiments, the heat engine 12 is an internal combustion engine. In accordance with an embodiment, where the heat engine 12 in an internal combustion engine, the engine assembly 10 may be used as a continuously variable load or generator using current phase shift in order to reduce the combustion engine output torque ripple content, cancel undesirable harmonics or to avoid resonances of the combustion engine with its load. The engine assembly 10 may be used to compensate for irregularities in the power output of the combustion engine that can exist in abnormal circumstances such as when one or more of the engine power generating elements (pistons, rotors, etc.) have reduced power output.

Figure 3:
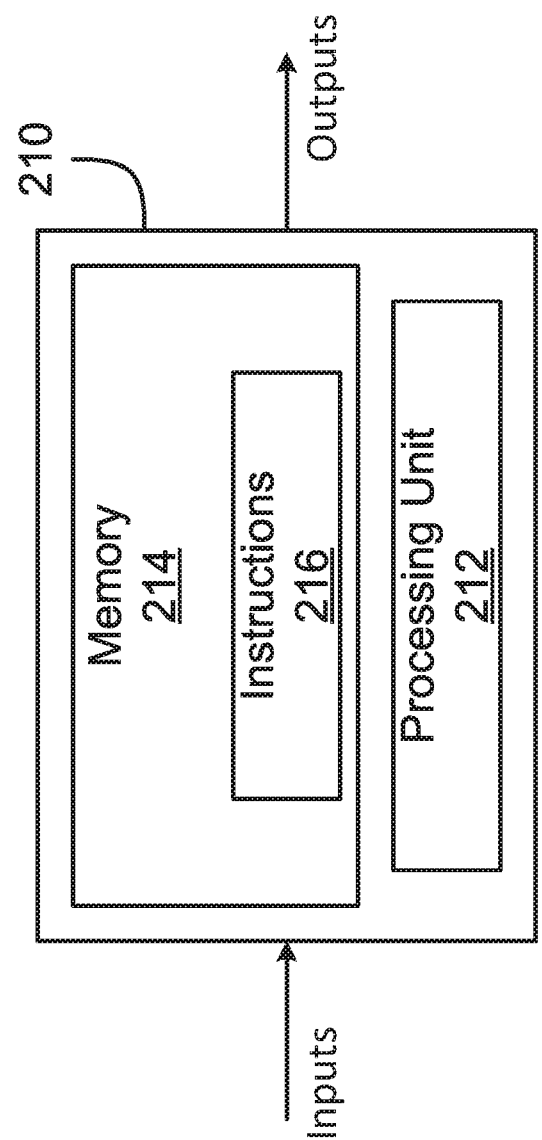
FIG. 3 is a schematic diagram of an example computing system in accordance with an embodiment.

With reference to FIG. 3, the EEC (reference 30 in FIG. 1) and/or the controller (reference 27 in FIG. 1) of the power electronics (reference 26 in FIG. 1) may be implemented by a computing device 200, comprising a processing unit 212 and a memory 214 which has stored therein computer-executable instructions 216. The processing unit 212 may comprise any suitable devices such that instructions 216, when executed by the computing device 210 or other programmable apparatus, may cause the functions/acts/steps of any methods as described herein to be executed. The processing unit 212 may comprise, for example, any type of general-purpose microprocessor or microcontroller, a digital signal processing (DSP) processor, a central processing unit (CPU), an integrated circuit, a field programmable gate array (FPGA), a reconfigurable processor, other suitably programmed or programmable logic circuits, or any combination thereof.

The memory 214 may comprise any suitable known or other machine-readable storage medium. The memory 214 may comprise non-transitory computer readable storage medium, for example, but not limited to, an electronic, magnetic, optical, electromagnetic, infrared, or semiconductor system, apparatus, or device, or any suitable combination of the foregoing. The memory 214 may include a suitable combination of any type of computer memory that is located either internally or externally to a device, for example random-access memory (RAM), read-only memory (ROM), compact disc read-only memory (CDROM), electro-optical memory, magneto-optical memory, erasable programmable read-only memory (EPROM), and electrically-erasable programmable read-only memory (EEPROM), Ferroelectric RAM (FRAM) or the like. Memory 214 may comprise any storage means (e.g., devices) suitable for retrievably storing machine-readable instructions 216 executable by processing unit 212.

Functionality of the EEC 30 and/or the controller 27 of the power electronics module 26 described herein may be implemented in a high level procedural or object oriented programming or scripting language, or a combination thereof, to communicate with or assist in the operation of a computer system, for example the computing device 200. Alternatively, functionality of the EEC 30 and/or the controller 27 of the power electronics module 26 may be implemented in assembly or machine language. The language may be a compiled or interpreted language. Program code for implementing functionality of the EEC 30 and/or the controller 27 of the power electronics module 26 may be stored on a storage media or a device, for example a ROM, a magnetic disk, an optical disc, a flash drive, or any other suitable storage media or device. The program code may be readable by a general or special-purpose programmable computer for configuring and operating the computer when the storage media or device is read by the computer to perform the procedures described herein. Functionality of the EEC 30 and/or the controller 27 of the power electronics module 26 may also be considered to be implemented by way of a non-transitory computer-readable storage medium having a computer program stored thereon. The computer program may comprise computer-readable instructions which cause a computer, or in some embodiments the processing unit 212 of the computing device 210, to operate in a specific and predefined manner to perform the functions described herein.

Computer-executable instructions may be in many forms, including program modules, executed by one or more computers or other devices. Generally, program modules include routines, programs, objects, components, data structures, etc., that perform particular tasks or implement particular abstract data types. Typically the functionality of the program modules may be combined or distributed as desired in various embodiments.

Various aspects of the present disclosure may be used alone, in combination, or in a variety of arrangements not specifically discussed in the embodiments described in the foregoing and is therefore not limited in its application to the details and arrangement of components set forth in the foregoing description or illustrated in the drawings. For example, aspects described in one embodiment may be combined in any manner with aspects described in other embodiments. Although particular embodiments have been shown and described, it will be obvious to those skilled in the art that changes and modifications may be made without departing from this invention in its broader aspects. The scope of the following claims should not be limited by the embodiments set forth in the examples, but should be given the broadest reasonable interpretation consistent with the description as a whole.

The invention claimed is:

1. An engine assembly for an aircraft, comprising:
a heat engine in driving engagement with an engine shaft having a first end coupled to a mechanical gearbox and a second end opposite the first end, wherein the first and second ends of the engine shaft extend from opposing sides of the heat engine;
an electric generator coupled to the second end to provide a generator output voltage, the electric generator separate from the mechanical gearbox;
a power electronics module connected to the electric generator and configured to regulate the generator output voltage to provide a regulated output voltage that meets an electrical power demand of the at least one aircraft accessory; and
a voltage bus dedicated for driving the at least one aircraft accessory, the voltage bus connected to the power electronics module separate from the mechanical gearbox and configured to supply the regulated output voltage to the at least one aircraft accessory.

2. The engine assembly of claim 1, wherein the regulated output voltage is a direct current (DC) voltage and wherein the power electronics module is configured to maintain the DC voltage at a substantially constant level in response to a changing power demand of the at least one aircraft accessory.

3. The engine assembly of claim 1, wherein the regulated output voltage is an alternating current (AC) voltage and wherein the power electronics module is configured to maintain at least one of a frequency of the AC voltage and a root mean square (RMS) level of the AC voltage substantially constant, in response to a changing power demand of the at least one aircraft accessory.

4. The engine assembly of claim 2, wherein the voltage bus is a direct current (DC) voltage bus.

5. The engine assembly of claim 3, wherein the voltage bus is an alternating current (AC) voltage bus.

6. The engine assembly of claim 1, wherein the electric generator is a starter-generator for starting the heat engine.

7. The engine assembly of claim 1, wherein the electric generator is electromagnetically coupled to the second end of the engine shaft by use of at least one high power density permanent magnet coupled to the engine shaft proximate the second end.

8. The engine assembly of claim 1, wherein the voltage bus is configured to supply the regulated output voltage to the at least one aircraft accessory comprising at least one of an electric motor, a linear actuator, a rotary actuator, an electric-mechanical machine, a hydraulic valve and a pneumatic valve having an electrical connection.

9. The engine assembly of claim 1, wherein the voltage bus is configured to supply the regulated output voltage to the at least one aircraft accessory comprising a cooling fan.

10. The engine assembly of claim 1, wherein the voltage bus is configured to supply the regulated output voltage to the at least one aircraft accessory comprising a wheel for taxiing the aircraft.

11. The engine assembly of claim 1, wherein the heat engine includes a rotor sealingly and rotationally received within an internal cavity to provide rotating chambers of variable volume in the internal cavity, the rotor having three apex portions separating the rotating chambers and mounted for eccentric revolutions within the internal cavity, the internal cavity having an epitrochoid shape with two lobes.

12. A method of providing electrical power to an aircraft, the method comprising:

rotating an engine shaft with a heat engine of an engine assembly, the engine shaft provided with a first end coupled to a mechanical gearbox and a second end opposite the first end, wherein the first and second ends of the engine shaft extend from opposing sides of the heat engine;

driving an electric generator with the engine shaft to provide a generator output voltage, the electric generator provided at the second end of the engine shaft;

regulating, using a power electronics module, the generator output voltage to provide a regulated output voltage that meets an electrical power demand of the at least one aircraft accessory; and supplying the regulated output voltage to the at least one aircraft accessory through a voltage bus dedicated for driving the at least one aircraft accessory and connected to the power electronics module separate from the mechanical gearbox.

13. The method of claim 12, wherein regulating the generator output voltage comprises regulating a direct current (DC) voltage at a substantially constant level in response to a changing power demand of the at least one aircraft accessory.

14. The method of claim 12, wherein regulating the generator output voltage comprises regulating at least one of a frequency of an alternating current (AC) voltage and a root mean square (RMS) level of the AC voltage at a substantially constant level in response to a changing power demand of the at least one aircraft accessory.

* * * * *